United States Patent

Saini et al.

[11] Patent Number: 5,172,109
[45] Date of Patent: Dec. 15, 1992

[54] METHOD OF REGISTERING A UNIT IN A NETWORK AT LEAST ONE PART OF WHICH IS CONSTITUTED FROM AN OPEN CHANNEL

[75] Inventors: Jasjit S. Saini, Rosenwiller; Pierre Troian, Hoenheim, both of France

[73] Assignee: Laboratoire Europeen de Recherches Electroniques Avancees, Courbevoie, France

[21] Appl. No.: 555,516

[22] PCT Filed: Dec. 12, 1989

[86] PCT No.: PCT/FR89/00645
§ 371 Date: Aug. 15, 1990
§ 102(e) Date: Aug. 15, 1990

[87] PCT Pub. No.: WO90/07239
PCT Pub. Date: Jun. 28, 1990

[30] Foreign Application Priority Data

Dec. 15, 1988 [FR] France .................... 88 16551

[51] Int. Cl.⁵ .................................... H04L 12/24
[52] U.S. Cl. .................... 340/825.07; 340/825.51; 340/505; 340/516

[58] Field of Search .......... 340/825.5, 825.51, 825.52, 340/825.06, 825.07, 502, 505, 506, 514, 516, 518, 532, 533; 375/38

[56] References Cited

U.S. PATENT DOCUMENTS 3,310,741 3/1967 Uitermark et al. .................... 375/38
3,662,267 5/1972 Reed .

FOREIGN PATENT DOCUMENTS 0291068 11/1988 European Pat. Off. .

Primary Examiner—Donald J. Yusko
Assistant Examiner—John Giust
Attorney, Agent, or Firm—Oblon, Spivak, McClelland, Maier & Neustadt

[57] ABSTRACT

In order to register items of equipment brought into service in an apartment equipped with an HF transmission channel home-automation network, it is first verified that no other item of equipment from a foreign network is requesting registration (18), then a registration request standby signal (20) is transmitted and, following reception of the identity request signal (26) before the completion of a specified temporization (27), the requested identity is communicated to the item of equipment, else the procedure is aborted and subsequently recommenced.

9 Claims, 2 Drawing Sheets

METHOD OF REGISTERING A UNIT IN A NETWORK AT LEAST ONE PART OF WHICH IS CONSTITUTED FROM AN OPEN CHANNEL

BACKGROUND OF THE INVENTION

1. Field of the Invention

The present invention relates to a method of registering a unit in a network at least one part of which is constituted from an open channel.

2. Discussion of Background

A transmission network, such as a home-automation network, may comprise "open" channels, that is to say channels which are able to be picked up by units not belonging to this network. This is the case for example for high-frequency electromagnetic wave transmission networks.

In a home-automation network which may comprise such open channels it is important that the various units linked to this network (domestic electrical equipment, audio and video equipment, observation sensors . . . ) each have an identity or address within the single network. Moreover, the units connected to an open transmission channel risk interfering with units connected to a neighbouring open network.

SUMMARY OF THE INVENTION

The subject of the present invention is a method of registering units connected to a communication network at least one part of which is constituted by an open channel, this method having to enable simple and unambiguous identification of all the units connected to this network, and these alone, and to attribute to them a registration characteristic of this network and unique for each unit.

The method of the invention consists, in a network of the abovementioned type and comprising network supervision means able to attribute a network identity and possibly an individual identity to each unit of the network, at the time of bringing each unit connected to the open channel into service, in initializing the attributing procedure, in verifying during a specified period of time whether any other similar neighbouring network whatsoever is initiating such a procedure, in recommencing the initialization at the end of a period of time in the affirmative or, in the negative, in continuing the procedure by sending to the network a registration request standby signal, in sending an item of identity information to a requesting unit if this request reaches the supervision means before the expiration of another specified period of time, or in aborting the procedure in the contrary case.

According to one aspect of the method of the invention, the item of identity information comprises the identity of the network and the identity of the unit in question.

According to another aspect of the invention, on bringing a unit into service, the attributing procedure is initialized, either automatically on connecting this unit to the supply network, or manually on pressing a button provided on this unit or on its support, this initialization triggering a temporization during which this unit places itself in a mode for listening for the transmission of a registration request standby signal, the unit sending its registration request if the standby signal reaches it before the expiry of the temporization, else the procedure aborts and must be recommenced from the initialization.

According to yet another aspect of the invention, the unit sends its registration request twice in succession, with an interval of time chosen randomly for each network, and if the supervision means observe that this time period has not been respected, they cause the attributing procedure to abort so as to cause it to recommence subsequently.

According to yet another aspect of the invention, the items of identity information are specified with the aid of a pseudo-random generator from the unique identity of the site where the network is situated, preferably the postal address of the building in which the network is situated if a home-automation network is involved, and if relevant, more precise information such as the name of the owner or of the tenant of the site.

BRIEF DESCRIPTION OF THE DRAWINGS

The present invention will be better understood on reading the detailed description of an embodiment, taken by way of non-limiting example and illustrated by the attached drawing, in which.

DETAILED DESCRIPTION OF THE PREFERRED EMBODIMENTS

Figure 1:
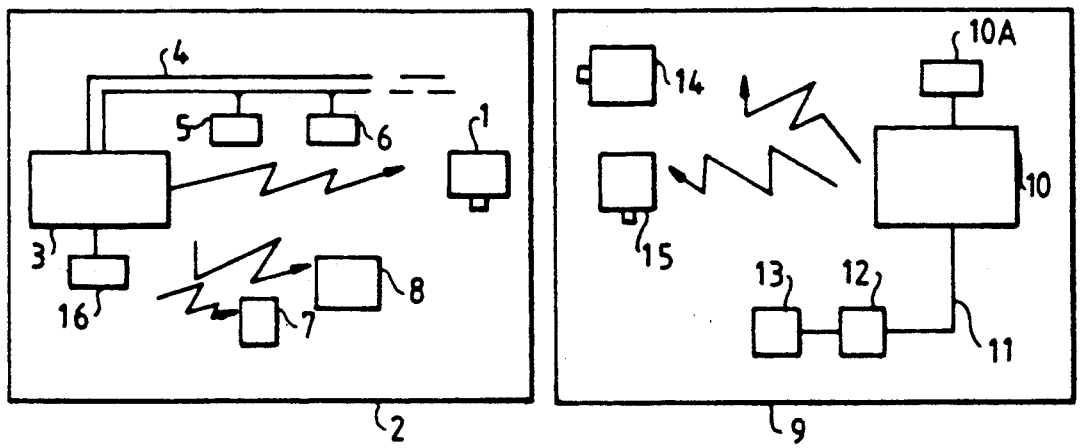
FIG. 1 is a very simplified diagram of two neighbouring home-automation networks for which the method of the invention may be implemented.

By way of example, the invention is described hereinunder in the application to a home-automation network comprising an open channel, but it is of course understood that the invention is not limited to such a network and may be applied to any transmission network comprising at least one open channel in which it is necessary to be able to identify without any ambiguity a specified unit prior to its registration so as to be able to communicate with it alone, at least in certain circumstances (for example, send a specific order to this unit alone, or else automatically identify it from numerous other similar units when it wishes to establish communication, without risking confusing it with other units belonging to other networks).

The home-automation network in which it is desired to register a new unit 1 is situated in a building 2. This network essentially comprises a central observation and control station 3 and several different transmission channels between this central station and the units supervised by this station. Two such channels have been shown in the present example. A first channel 4 is constituted from a link by pairs of stranded wires connecting security devices (intruder sensors for example) to this central station. Two of these security devices, referenced 5, 6, have been shown on the drawing.

Moreover, the central station 3 controls electrodomestic equipment, such as video recorders, heating equipment, by H.F. (high frequency) link, for example for their automatic turning on and their turning off. Two such items of electro-domestic equipment, referenced 7, 8, have been shown on the drawing. It is assumed that these items of equipment have already registered according to the method of the invention which is explained hereinbelow for the registering of the item of equipment 1 having just been placed in the building 2.

The building 2 is neighboured by several other buildings comprising similar H.F. transmission channel home-automation networks. Only buildings whose H.F. transmission channels can be picked up, at least occasionally, by the equipment connected to the H.F. channel of the building 2 are considered here. A single one, referenced 9, from among these neighbouring buildings has been shown on the drawing. The home-automation network of the building 9 comprises a central station 10 connected to a channel 11, for example a coaxial cable. Items of equipment 12, 13 are connected to the channel 11. Furthermore, the station 10 is connected via a high frequency channel to other items of equipment, such as the items of equipment 14, 15, alone shown on the drawing. This high frequency channel can be picked up by the items of equipment 1, 7, 8 and the station 3 of the building 2.

Figure 2:
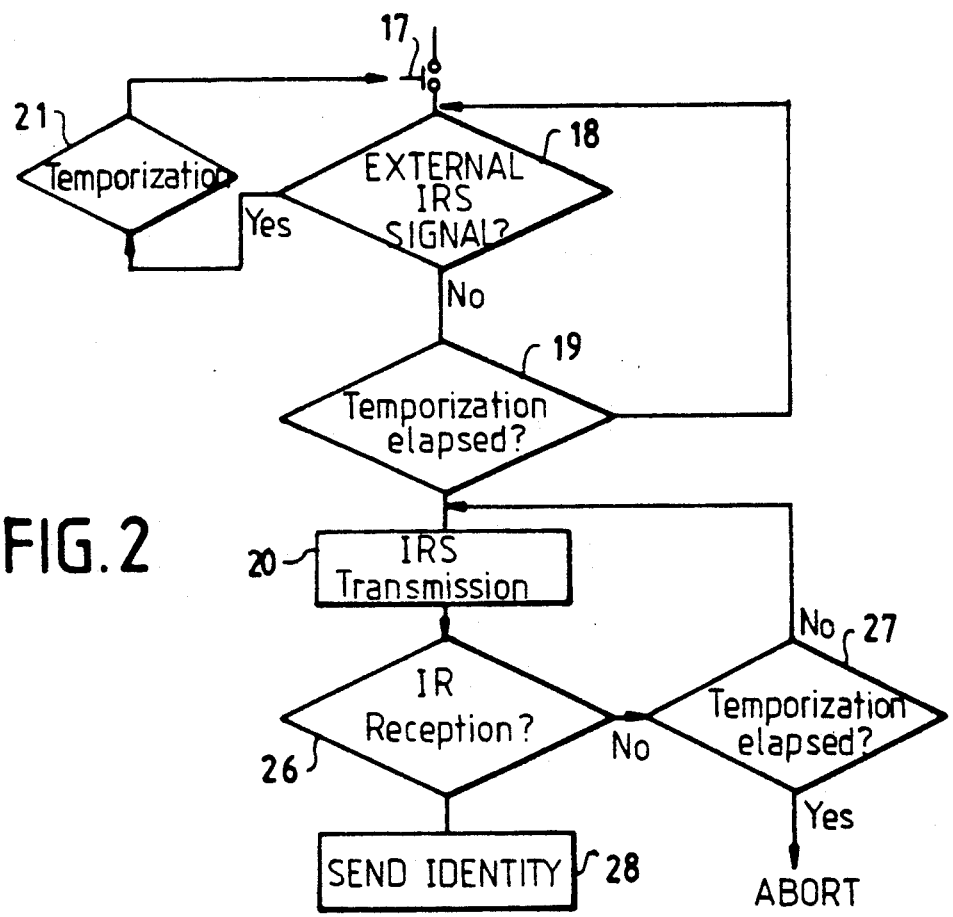

In order to avoid any interference with the H.F. network of the building 9 at the time that the equipment 1 is brought into service, when this latter transmits a registration request towards the station 3, a procedure is followed in the way explained hereinunder with reference to the FIGS. 2 (flow diagram of the procedure for the central station 3) and 3 (flow diagram of the procedure for the unit 1).

The procedure is initialized, central station 3 side, with the aid of a transmission channel supervision circuit 16 connected to the central station 3 (or integral with the latter). An operator presses a button 17 of this supervision circuit which then places itself (18) in a mode for listening for a possible identity request standby "IRS" signal which may be transmitted at that moment by another central station, such as the station 10. If during a certain period of time (temporization 19), the circuit 16 receives no IRS signal, it passes to the following step (20) and itself transmits an IRS signal preferably comprising the identity of its network. In the present example the temporization 19 is about 2 seconds.

If before the end of the temporization 19, the circuit 16 receives an IRS signal, coming therefore from a foreign network, it triggers another temporization (21) at the end of which it automatically proceeds to another initialization (from the step 18). This temporization 21 must be of sufficient duration to enable the said foreign network to carry out its own registration procedure. This duration is, for example, about 1 minute. According to a variant, instead of the triggering of the temporization 21, the circuit 16 may simply trigger an appropriate alarm and the operator himself proceeds to another initialization as soon as he deems it possible, by again pressing the button 17.

Figure 3:
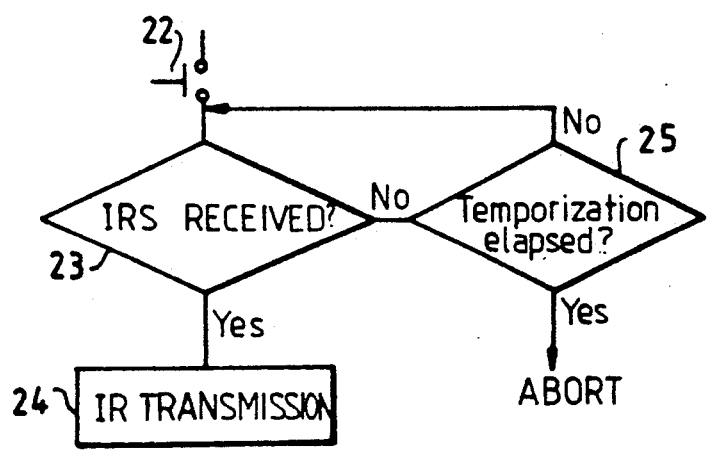

The IRS signal transmitted by the circuit 16 must normally be accepted by the equipment 1. This equipment 1 comprises an identity request initialization button 22 (see FIG. 3). The operator depresses this button once the equipment is installed, after having depressed the button 17. The depression of the button 22 causes the bringing into service of the receiver of the equipment 1. According to a variant, this bringing into service of the receiver of the equipment 1 is automatically triggered once the equipment 1 is plugged into the mains supply.

Once the receiver of the equipment 1 has received (23) the IRS signal transmitted at the step 20, it transmits an identity request "IR" signal (24) comprising the address of the network, if this address has been included in IRS.

If the receiver of the equipment 1 does not receive any IRS signal it immediately triggers a temporization (25). If on the lapse of this temporization 25 the receiver has still not received any IRS signal, the procedure aborts and everything must be recommenced from the start. The temporization 25 is, for example, around 2 seconds.

As for the central station, once the latter has transmitted an IRS signal it places itself in a mode for listening for an IR signal (26) and triggers a temporization (27). If it receives nothing immediately after having transmitted the IRS signal it retransmits another IRS signal and verifies whether an IR signal is immediately transmitted (26). If it then receives an IR signal it sends the required address to the equipment 1. If it still receives no IR signal the transmission of the IRS signal/IR signal reception standby cycle continues and this, until the lapse of the temporization 27. If on the lapse of the temporization 27 the station 3 has still not received any IR signal, the procedure aborts and everything must be recommenced from the start. The duration of the temporization 27 is, for example, of about 1 minute.

If there is abortion, the procedure may be recommenced either manually by the operator who is alerted by an alarm and presses the button 17 (and the button 22 if relevant), or, automatically on the initiative of the station 3 at the end of a period of time which may, for example, be about 1 minute.

In a network such as that described hereinabove, conflicts may arise in the case where neighbouring central stations (for example 3 and 10) cannot pick each other up because too distant from one another, but the items of equipment (such as the items of equipment 1 and 15) closer to one another can pick up the foreign central station in addition to their own station. In such a case the invention provides for causing transmission of the IRS signal at a higher level and the IR or address transmission signals at a lower level. Thus, if circuit 16 of the station 3 cannot then pick up the IRS signal from the station 10 it is highly improbable that the circuit 10A (homologue of the circuit 16) of the station 10 can pick up the IR signal or the address transmission signal, of lower level, from the equipment 1. Of course, if the circuit 16 did pick up the IRS signal from the circuit 10A, it would pass to the step 21.

Figure 4:
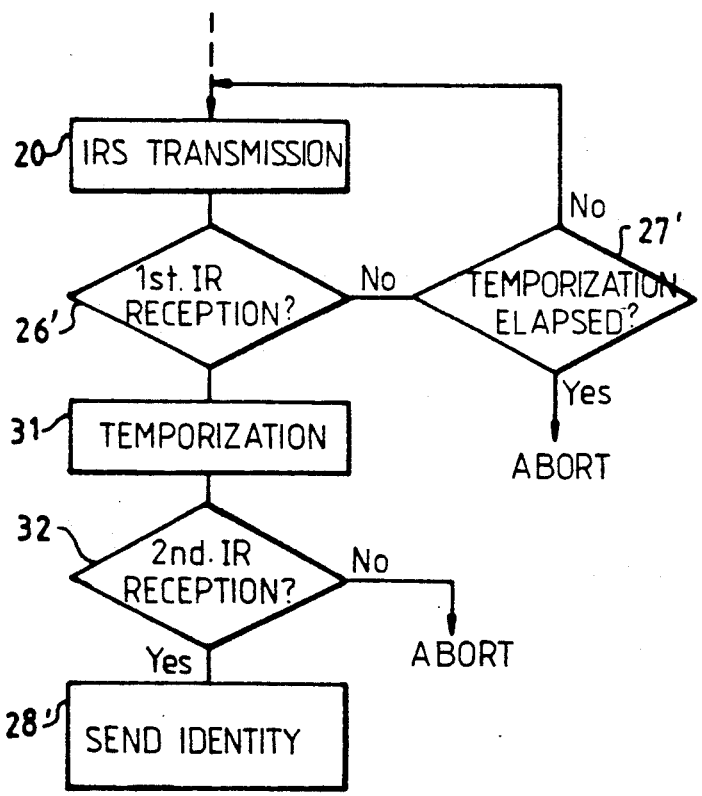
FIGS. 2, 3, 4, and 5 are flow diagrams of the registering method according to the invention.
Figure 5:
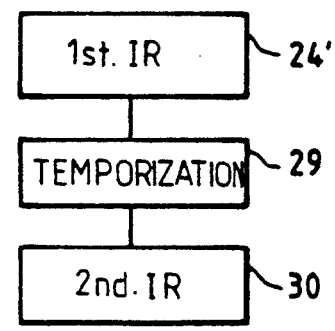

According to an advantageous variant of the invention, shown in FIGS. 4 and 5, the equipment 1 transmits a first IR signal (24') which triggers in this equipment a temporization (29) the duration of which is chosen at random for each network. On the lapse of this temporization 29, the equipment 1 transmits a second IR signal (30).

In the station 3, the reception of the first IR signal (26') passes off as explained previously (temporization 27'). Once this first IR signal is received, a temporization (31) is triggered and its duration is equal to that of the temporization 29. On the lapse of the temporization 31 the station 3 awaits the reception of the second IR signal (32). If this second signal does not arrive immediately, the procedure aborts, else the requested identity is transmitted (28).

According to an advantageous aspect of the invention, the requested identity may be formulated in the following way. On bringing the network into service, a unique identity code, for example the alphanumeric postal code of the apartment 2, is introduced into the station 3 with the aid of, for example, a data insertion keyboard. According to one embodiment, this postal code may comprise up to 30 characters of 6 bits each. This code then serves to seed a pseudo-random generator. A portion of the bits (for example, the 24 least significant bits) of the number produced by the pseudo-random generator is selected in order to be used as an identity for the equipment to be installed. Thus, it is in practise improbable that the items of HF equipment from two neighbouring networks would have the same identity. Moreover, in the event that this identity is lost, it is possible to regenerate it very easily.

We claim:

1. A method of registering a unit in a network having a plurality of units and at least one part of said network being constituted from an open channel and wherein said network includes a network supervisory means able to attribute an individual identity to each unit of the network, said method comprising the steps of:

connecting each unit to said open channel;

bringing each unit into service and simultaneously initializing an attributing procedure by verifying whether, during a first specific period of time, any other similar neighboring network is initiating a respective attributing procedure;

recommencing the initialization if any other similar neighboring network is initiating a respective attributing procedure before the end of a second specified period of time;

continuing the attributing procedure by sending to the network an identification request standby signal if no other similar neighboring network is initiating a respective attributing procedure before the end of said second specified period of time;

sending an item of identifying information to a requesting unit if an identifying request from said requesting unit reaches the supervisory means before the expiration of a third specified period of time, or in aborting the procedure if said identifying request does not reach the supervisory means before the expiration of said third specified period of time.

2. Method according to claim 1, characterized in that the item of identity information comprises the identity of the network and the identity of the unit in question.

3. Method according to claim 1, characterized in that on bringing a unit into service the attributing procedure is automatically initialized on joining up said unit to the supply network.

4. Method according to claim 1, characterized in that on bringing a unit into service the attributing procedure is manually initialized upon pressing a button provided on said unit or on its support.

5. Method according to claim 3, characterized in that the initialization on bringing the unit into service triggers a temporization during which said unit places itself in a mode for listening for the transmission of said identifying request standby signal, the unit sending its identifying request if the standby signal reaches it before the lapse of the temporization, else the procedure aborts and must be recommenced from the initialization.

6. A method according to claim 1, characterized in that the unit sends its identification request twice in succession separated by an interval of time chosen at random for each network, and if the supervisory means determines that this time interval between the twice sent identification request has not been followed, the attributing procedure is absorted.

7. Method according to claim 1, characterized in that the transmission of the identity request standby signal is made at a higher level than the transmission of the identity request and identity information signals.

8. Method according to claim 1, characterized in that the items of identity information are specified with the aid of a pseudo-random generator from the identity of a site where the network is situated.

9. Method according to claim 8, implemented for a home-automation network, characterized in that the identity of a site where a network is situated is a postal address of the building in which the network is installed.

* * * * *